United States Patent
Drane et al.

(10) Patent No.: US 6,928,616 B2
(45) Date of Patent: Aug. 9, 2005

(54) METHOD AND APPARATUS FOR ALLOWING ONE BOOKMARK TO REPLACE ANOTHER

(75) Inventors: Jacqueline Claire Drane, Austin, TX (US); Nyralin Novella Kline, Round Rock, TX (US); Jessica Kelley Murillo, Hutto, TX (US); Joshua Edwin Phillips, Austin, TX (US); Johnny Meng-Han Shieh, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 673 days.

(21) Appl. No.: 09/956,763

(22) Filed: Sep. 20, 2001

(65) Prior Publication Data

US 2003/0052918 A1 Mar. 20, 2003

(51) Int. Cl.[7] ................................................ G09G 5/00
(52) U.S. Cl. ..................................................... 715/739
(58) Field of Search ................................. 715/738, 739, 715/745, 747, 760, 810

(56) References Cited

U.S. PATENT DOCUMENTS

| | | | | |
|---|---|---|---|---|
| 5,892,908 A | * | 4/1999 | Hughes et al. ............... | 709/250 |
| 5,917,491 A | * | 6/1999 | Bauersfeld .................... | 345/810 |
| 5,963,964 A | * | 10/1999 | Nielsen ........................ | 715/501.1 |
| 6,037,934 A | * | 3/2000 | Himmel et al. .............. | 715/760 |
| 6,041,360 A | * | 3/2000 | Himmel et al. .............. | 709/245 |
| 6,100,890 A | * | 8/2000 | Bates et al. .................. | 345/826 |
| 6,160,552 A | * | 12/2000 | Wilsher et al. .............. | 715/739 |
| 6,476,827 B1 | * | 11/2002 | Porter ........................... | 345/738 |
| 6,546,393 B1 | * | 4/2003 | Khan ........................... | 707/10 |

OTHER PUBLICATIONS

Microsoft Internet Explorer (copy right 1995–2001).*

* cited by examiner

*Primary Examiner*—Kristine Kincaid
*Assistant Examiner*—Thanh Vu
(74) *Attorney, Agent, or Firm*—Volel Emile; Mark E. McBurney

(57) ABSTRACT

A method, system and apparatus for managing a bookmark folder are provided. In an embodiment of the invention, when a user accesses a Web page using an embedded link from a displayed bookmarked Web page, the user may, if so desires, replace the bookmarked Web page by simply bookmarking the accessed Web page. The replacement is done automatically. In another embodiment of the invention, when a user wants to bookmark a Web page, the URL of the Web page is compared with the URLs of all bookmarked Web pages. If the URL of one of the bookmarked Web pages is similar with the URL of the Web page to be bookmarked, the user may, again if so desires, replace the bookmarked Web page by the bookmark of the new page. Similarity may be determined by user defined rules such as subject matter or differences in URL branches.

16 Claims, 5 Drawing Sheets

METHOD AND APPARATUS FOR ALLOWING ONE BOOKMARK TO REPLACE ANOTHER

BACKGROUND OF THE INVENTION

1. Technical Field

The present invention is directed to a method and apparatus for managing bookmark folders. More specifically, the present invention is directed to a method and apparatus for managing folders of bookmarks.

2. Description of Related Art

As is well known by now, the World Wide Web (WWW) or Internet is a system of servers that support documents formatted in Hyper Text Markup Language (HTML). HTML supports links to documents as well as to graphics, audio and video files. Links are references to documents from within other documents. Links allow a user to easily jump from one document or Web page to another with just a click of a mouse. Thus, a link is a very useful Internet navigational tool.

Another useful Internet navigational tool is a bookmark. A bookmark is a feature that is available in most Web browsers (A web browser is a software application used to locate Web sites and display web pages) that allows a user to save addresses or URLs (abbreviation for Uniform Resource locators) of web pages into a folder (i.e., a bookmark folder) for later retrieval.

When a user accesses a Web page that may later be revisited, the user may bookmark the page. If after revisiting the Web page, the user, through a link in the Web page, accesses another Web page that deals with the interested subject matter, the user may also bookmark that Web page. However, if the user concludes that the second Web page is of more relevance to the subject matter than the first, the user may not want to retain the first bookmark.

Presently, when this situation occurs, the user has to manually delete the first bookmark. If not, the user will have two bookmarks that may have the same or confusing title.

Hence, what is needed is a method and apparatus that allow one bookmark to automatically supersede or replace another.

SUMMARY OF THE INVENTION

The present invention provides a method, system and apparatus for managing a bookmark folder. In an embodiment of the invention, when a user accesses a Web page using an embedded link from a displayed bookmarked Web page, the user may, if so desires, replace the bookmarked Web page by simply bookmarking the accessed Web page. The replacement is done automatically.

In another embodiment of the invention, when a user wants to bookmark a Web page, the URL of the Web page is compared with the URLs of all bookmarked Web pages. If the URL of one of the bookmarked Web pages is similar with the URL of the Web page to be bookmarked, the user may, again if so desires, replace the bookmarked Web page by the bookmark of the new page. Similarity may be determined by user sdjustable rules, such as subject matter or differences in URL branches.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
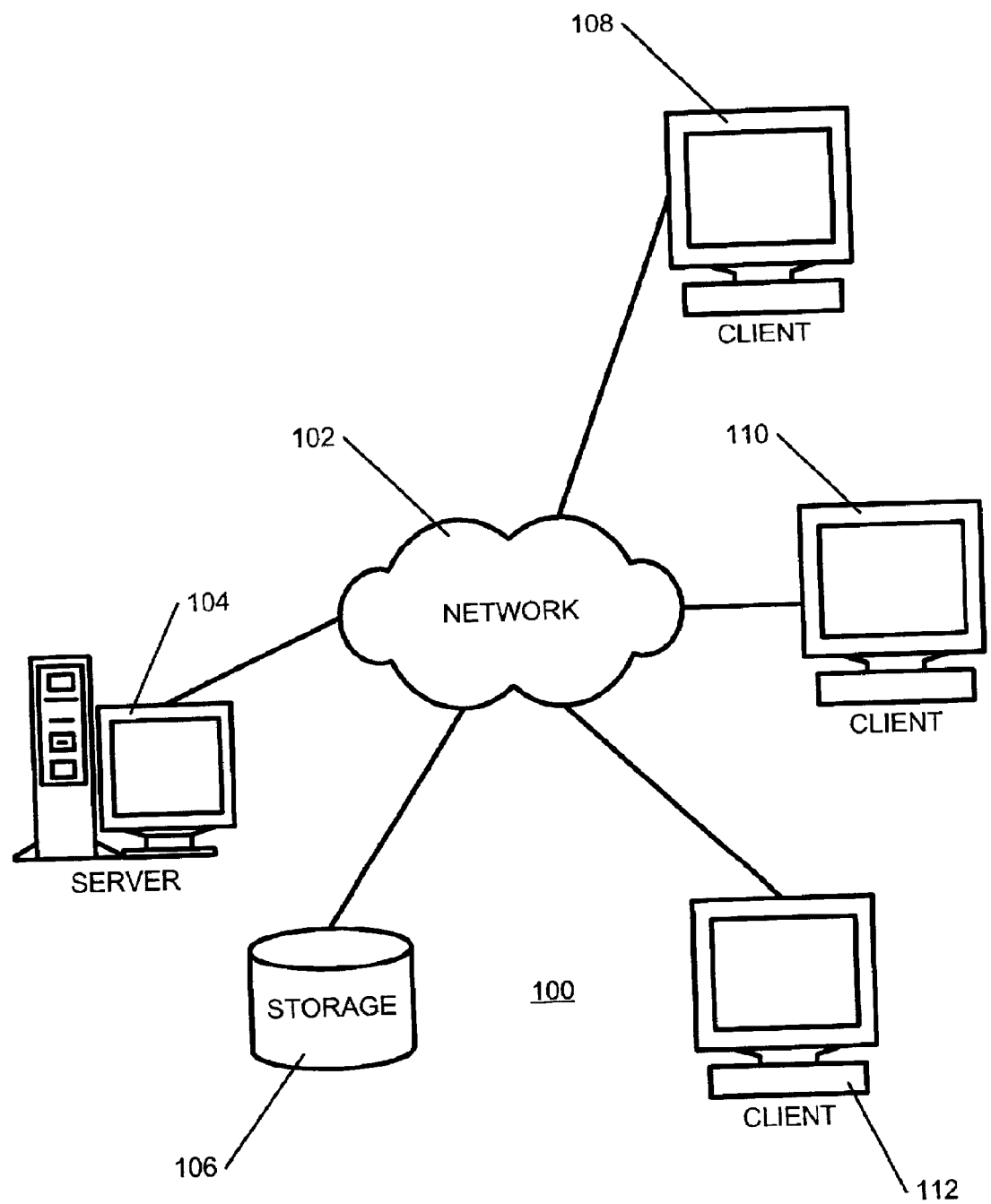
FIG. 1 is an exemplary block diagram illustrating a distributed data processing system according to the present invention.

With reference now to the figures, FIG. 1 depicts a pictorial representation of a network of data processing systems in which the present invention may be implemented. Network data processing system 100 is a network of computers in which the present invention may be implemented. Network data processing system 100 contains a network 102, which is the medium used to provide communications links between various devices and computers connected together within network data processing system 100. Network 102 may include connections, such as wire, wireless communication links, or fiber optic cables.

In the depicted example, server 104 is connected to network 102 along with storage unit 106. In addition, clients 108, 110, and 112 are connected to network 102. These clients 108, 110, and 112 may be, for example, personal computers or network computers. In the depicted example, server 104 provides data, such as boot files, operating system images, and applications to clients 108, 110 and 112. Clients 108, 110 and 112 are clients to server 104. Network data processing system 100 may include additional servers, clients, and other devices not shown. In the depicted example, network data processing system 100 is the Internet with network 102 representing a worldwide collection of networks and gateways that use the TCP/IP suite of protocols to communicate with one another. At the heart of the Internet is a backbone of high-speed data communication lines between major nodes or host computers, consisting of thousands of commercial, government, educational and other computer systems that route data and messages. Of course, network data processing system 100 also may be implemented as a number of different types of networks, such as for example, an intranet, a local area network (LAN), or a wide area network (WAN). FIG. 1 is intended as an example, and not as an architectural limitation for the present invention.

Figure 2:
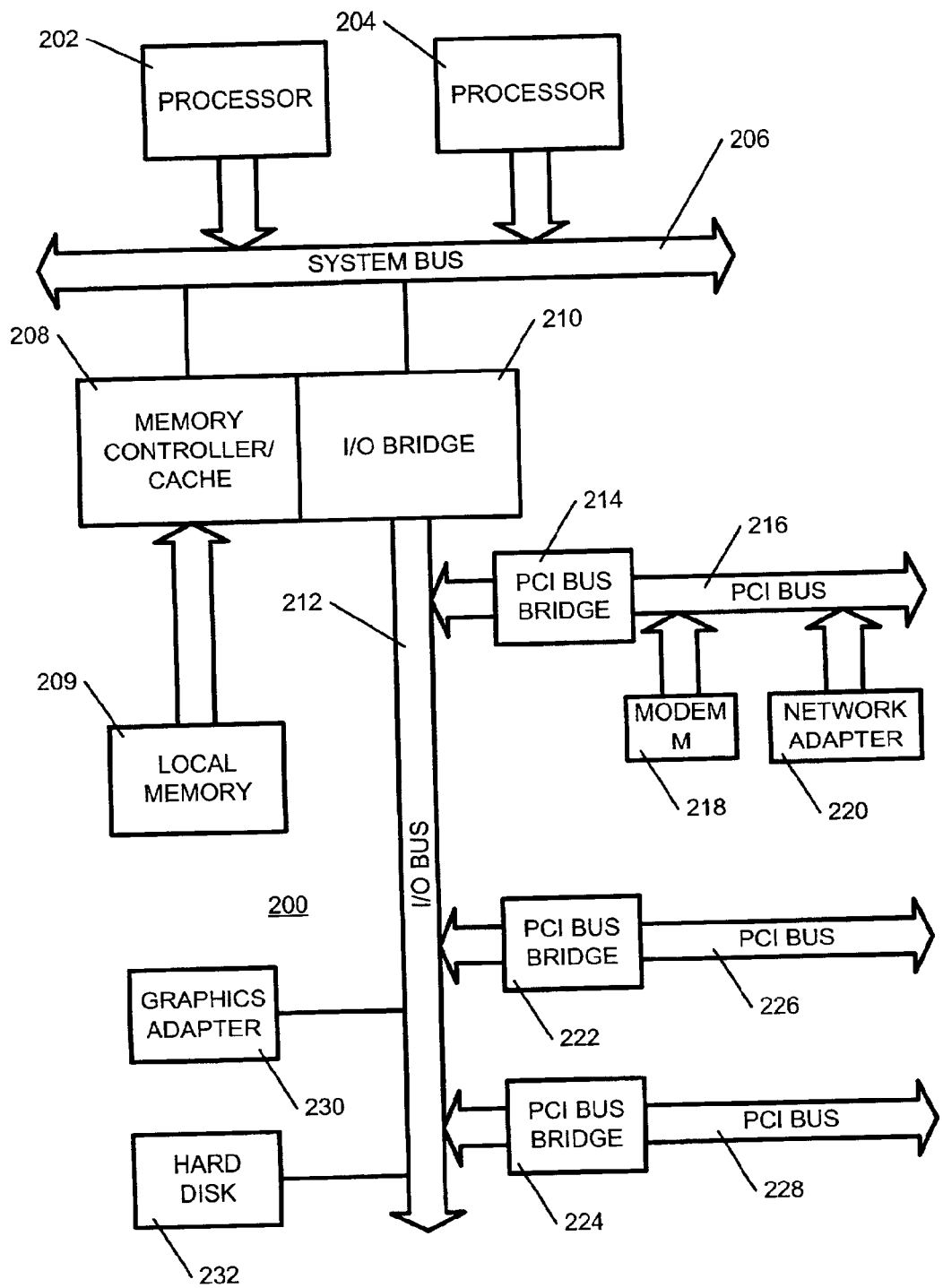
FIG. 2 is an exemplary block diagram of a server apparatus according to the present invention.

Referring to FIG. 2, a block diagram of a data processing system that may be implemented as a server, such as server 104 in FIG. 1, is depicted in accordance with a preferred embodiment of the present invention. Data processing system 200 may be a symmetric multiprocessor (SMP) system including a plurality of processors 202 and 204 connected to system bus 206. Alternatively, a single processor system may be employed. Also connected to system bus 206 is memory controller/cache 208, which provides an interface to local memory 209. I/O bus bridge 210 is connected to system bus 206 and provides an interface to I/O bus 212. Memory controller/cache 208 and I/O bus bridge 210 may be integrated as depicted.

Peripheral component interconnect (PCI) bus bridge 214 connected to I/O bus 212 provides an interface to PCI local bus 216. A number of modems may be connected to PCI local bus 216. Typical PCI bus implementations will support four PCI expansion slots or add-in connectors. Communications links to network computers 108, 110 and 112 in FIG. 1 may be provided through modem 218 and network adapter 220 connected to PCI local bus 216 through add-in boards. Additional PCI bus bridges 222 and 224 provide interfaces for additional PCI local buses 226 and 228, from which additional modems or network adapters may be supported. In this manner, data processing system 200 allows connections to multiple network computers. A memory-mapped graphics adapter 230 and hard disk 232 may also be connected to I/O bus 212 as depicted, either directly or indirectly.

Those of ordinary skill in the art will appreciate that the hardware depicted in FIG. 2 may vary. For example, other peripheral devices, such as optical disk drives and the like, also may be used in addition to or in place of the hardware depicted. The depicted example is not meant to imply architectural limitations with respect to the present invention.

The data processing system depicted in FIG. 2 may be, for example, an IBM e-Server pSeries system, a product of International Business Machines Corporation in Armonk, N.Y., running the Advanced Interactive Executive (AIX) operating system or LINUX operating system.

Figure 3:
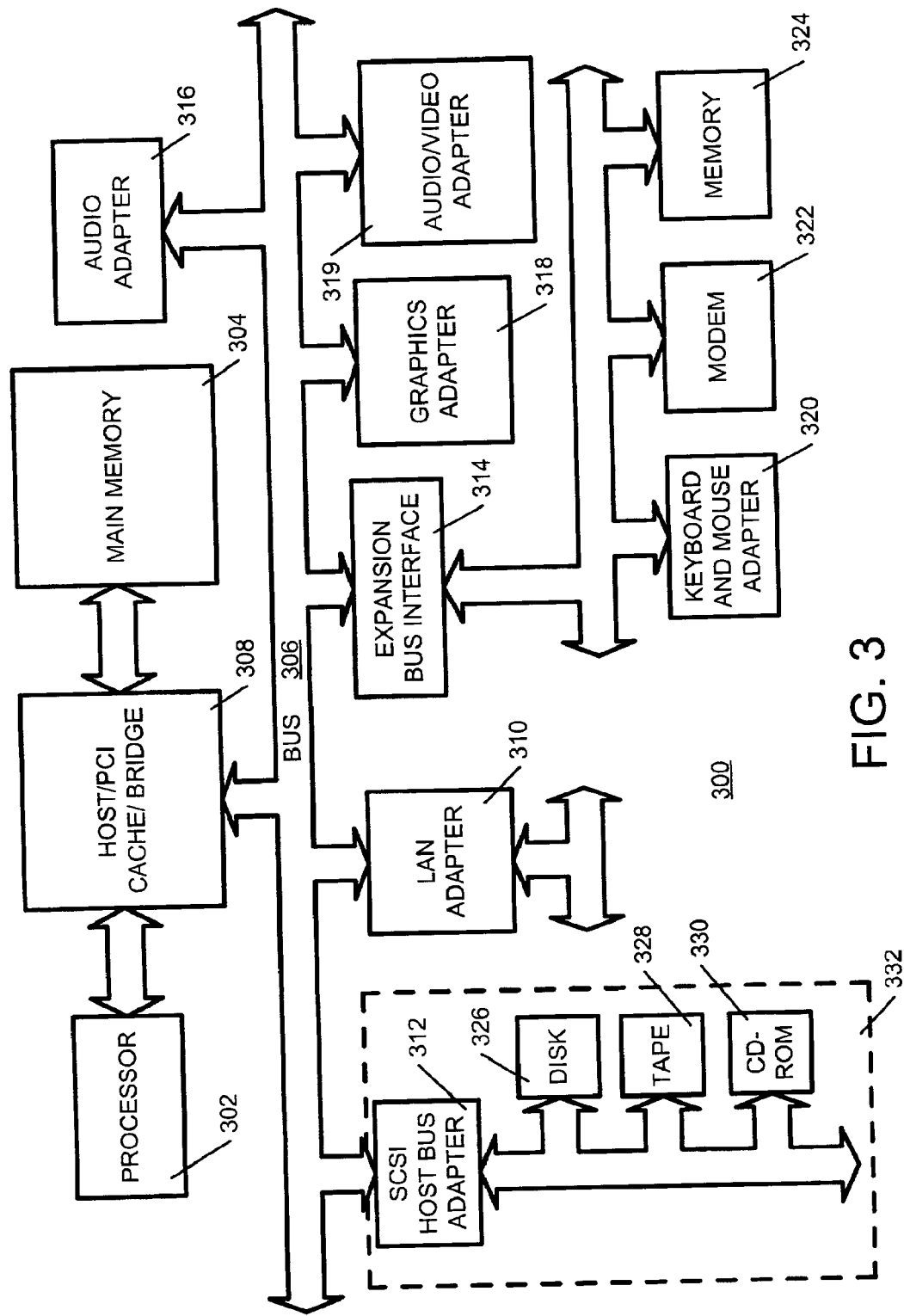
FIG. 3 is an exemplary block diagram of a client apparatus according to the present invention.

With reference now to FIG. 3, a block diagram illustrating a data processing system is depicted in which the present invention may be implemented. Data processing system 300 is an example of a client computer. Data processing system 300 employs a peripheral component interconnect (PCI) local bus architecture. Although the depicted example employs a PCI bus, other bus architectures such as Accelerated Graphics Port (AGP) and Industry Standard Architecture (ISA) may be used. Processor 302 and main memory 304 are connected to PCI local bus 306 through PCI bridge 308. PCI bridge 308 also may include an integrated memory controller and cache memory for processor 302. Additional connections to PCI local bus 306 may be made through direct component interconnection or through add-in boards. In the depicted example, local area network (LAN) adapter 310, SCSI host bus adapter 312, and expansion bus interface 314 are connected to PCI local bus 306 by direct component connection. In contrast, audio adapter 316, graphics adapter 318, and audio/video adapter 319 are connected to PCI local bus 306 by add-in boards inserted into expansion slots. Expansion bus interface 314 provides a connection for a keyboard and mouse adapter 320, modem 322, and additional memory 324. Small computer system interface (SCSI) host bus adapter 312 provides a connection for hard disk drive 326, tape drive 328, and CD-ROM drive 330. Typical PCI local bus implementations will support three or four PCI expansion slots or add-in connectors.

An operating system runs on processor 302 and is used to coordinate and provide control of various components within data processing system 300 in FIG. 3. The operating system may be a commercially available operating system, such as Windows 2000, which is available from Microsoft Corporation. An object oriented programming system such as Java may run in conjunction with the operating system and provide calls to the operating system from Java programs or applications executing on data processing system 300. "Java" is a trademark of Sun Microsystems, Inc. Instructions for the operating system, the object-oriented operating system, and applications or programs are located on storage devices, such as hard disk drive 326, and may be loaded into main memory 304 for execution by processor 302.

Those of ordinary skill in the art will appreciate that the hardware in FIG. 3 may vary depending on the implementation. Other internal hardware or peripheral devices, such as flash ROM (or equivalent nonvolatile memory) or optical disk drives and the like, may be used in addition to or in place of the hardware depicted in FIG. 3. Also, the processes of the present invention may be applied to a multiprocessor data processing system.

As another example, data processing system 300 may be a stand-alone system configured to be bootable without relying on some type of network communication interface, whether or not data processing system 300 comprises some type of network communication interface. As a further example, data processing system 300 may be a Personal Digital Assistant (PDA) device, which is configured with ROM and/or flash ROM in order to provide non-volatile memory for storing operating system files and/or user-generated data.

The depicted example in FIG. 3 and above-described examples are not meant to imply architectural limitations. For example, data processing system 300 may also be a notebook computer or hand held computer in addition to taking the form of a PDA. Data processing system 300 also may be a kiosk or a Web appliance.

The present invention provides an apparatus and method that allow one bookmark to replace another. The invention may be local to client systems 108, 110 and 112 of FIG. 1 or to the server 104 or to both the server 104 and clients 108, 110 and 112. Consequently, the present invention may reside on any data storage medium (i.e., floppy disk, compact disk, hard disk, ROM, RAM, etc.) used by a computer system.

To better understand the invention, an example will be provided. Suppose a user accesses an instruction or tutorial manual over the Internet and bookmarks its URL. In addition, suppose the tutorial is organized by topics having each its own URL. Suppose further that after reading a few topics, the user decides to resume the reading of the tutorial at a later time. The user may then want to bookmark the topic where reading is to resume. If not, when the user is ready to resume reading, the user may have to access the tutorial at the location previously bookmarked (in this example, it would be at the beginning of the tutorial).

Web browsers have a feature that indicates to users previously visited URLs. Ordinarily, the previously visited URLs are of a different color than the ones that have not previously been visited. Consequently, the Table of Contents listing the different topics may be used to access the next topic to be read (the list of topics, in this case, is usually a list of links). Therefore, accessing the tutorial from the beginning may not be too burdensome.

However, if a user accidentally went to a previously unread topic and upon realizing the mistake went to the intended topic, the topic accidentally accessed will be marked as read. Furthermore, the feature that indicates previously visited topics is time-definite. Thus, if the user takes too long to re-access the tutorial for the continued reading, the feature may have timed out and all topics may be shown as unread. Moreover, it is quite common for several related Web pages to have the same or very confusing bookmark titles, albeit pointing to different URLs. For all the above reasons, the user may have to access a few already read topics before finding the last topic read.

Consequently, a user may each time choose to bookmark the location where reading is to resume. But, if the user does not delete previous related bookmarks and if the user accesses and bookmarks related Web pages frequently, the bookmark folder may quickly become very unmanageable.

The present invention provides a tool to quickly and effortlessly manage the bookmark folder. Note that the method of bookmarking a Web page will not be herein explained since it is well known in the field. The invention will be disclosed in conjunction with FIGS. 4 and 5.

Figure 4:
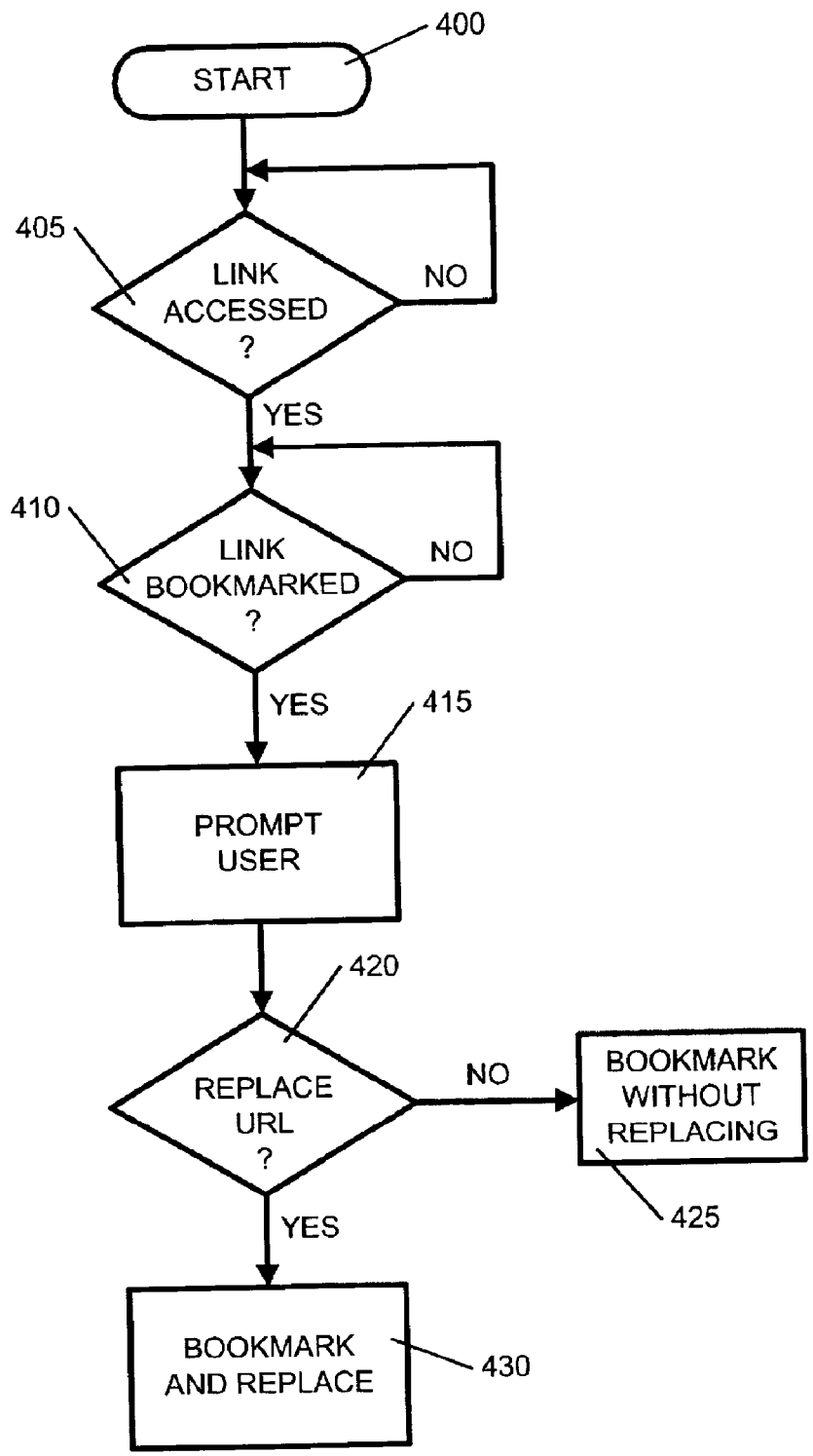
FIG. 4 is a flow diagram of an embodiment of the invention.

FIG. 4 is a flow diagram illustrating a process used by the invention. When a user accesses a Web page through a bookmarked URL, the process of the invention starts (step 400). A test is continuously being made as to whether the user accesses a link from the displayed Web page (step 405). Note that, the test may be continually being made as the user jumps from one Web page to another, so long as the presently displayed Web page emanated from a succession of links from a previously displayed bookmarked Web page.

If the user decides to bookmark the link (step 410), the user will be prompted as to whether the previously bookmarked URL is to be replaced by the URL of the link (steps 415 and 420). If so, the URL of the link will be bookmarked and the previously bookmarked URL deleted (step 430). If not, the URL of the link will be bookmarked without deleting the previously bookmarked URL (step 425).

Figure 5:
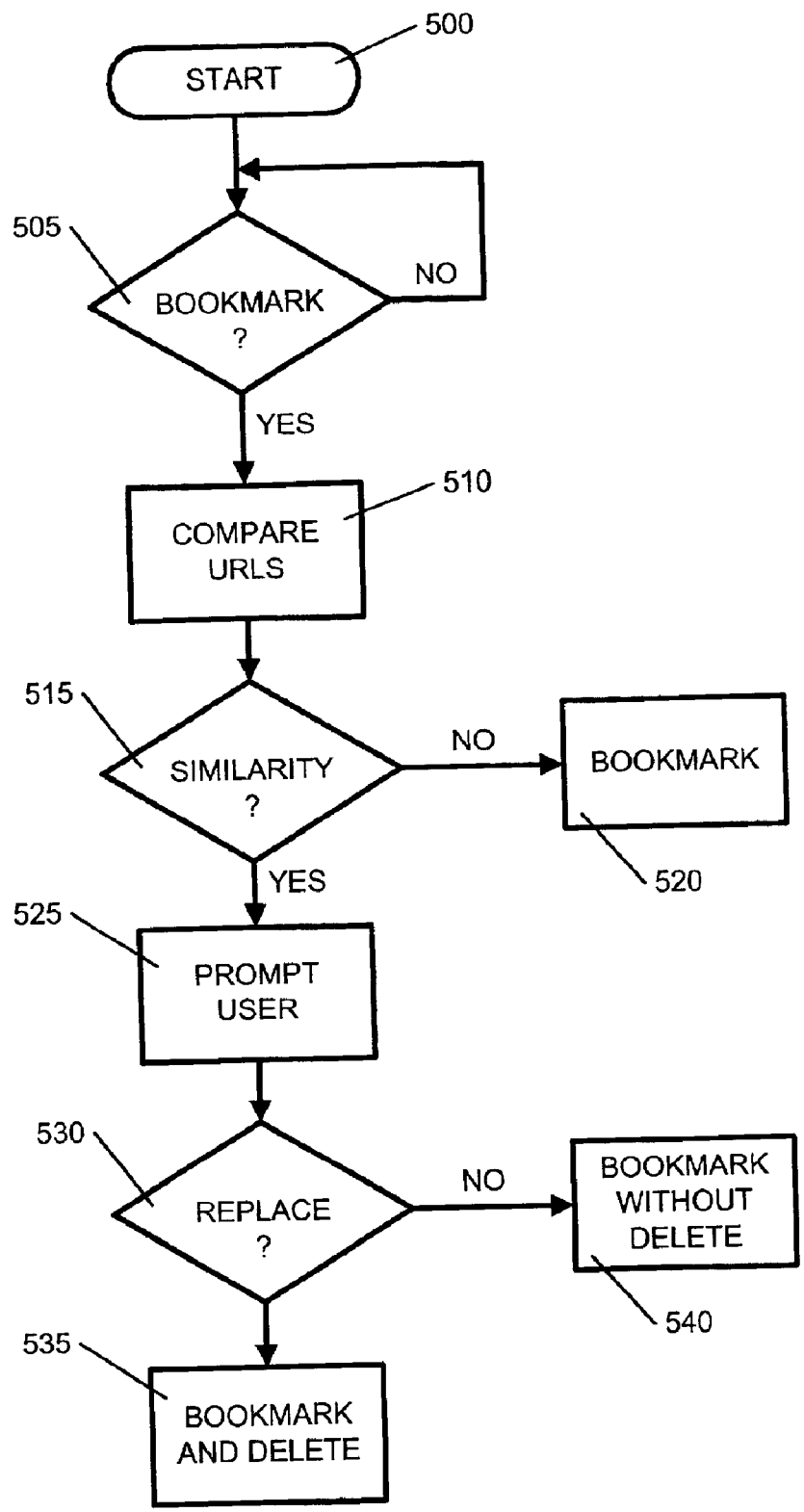
FIG. 5 is a flow diagram of another embodiment of the invention.

FIG. 5 illustrates another embodiment of the invention. In FIG. 5, the process will start as soon as the Web browser is accessed (step 500). A check is then continuously made as to whether the user wants to bookmark a Web page (step 505). If so, the invention compares all URLs of presently bookmarked pages for similarities with the URL of the new Web page to be bookmarked (step 510). In this case, a bookmarked URL is similar to a URL to be bookmarked, if they differ by one branch. For example, if a bookmarked URL is: www.gtk.org/tutorial/ch-introduction.html and the URL to be bookmarked is: www.gtk.org/tutorial/ch-gettingstarted.html, they differ by one branch. Note that the invention may be designed to regard URLs of two Web pages as similar if they differ by N branches, where N is an integer. Alternatively, the invention may be designed to compare root URLs or root plus N branched URLs for similarity, again N is an integer. In this example, www.gtk.org is a root URL. Furthermore, the invention may be designed to use only top level bookmarks (i.e., no sub-folder bookmarks) or bookmarks all the way down to the Nth level for the comparison, here too, N is an integer.

In any case, if the URL of the Web page to be bookmarked is not similar to an existing URL of a bookmarked page, the URL of the Web page will be bookmarked (steps 515 and 520). If there is a similarity with an existing bookmarked URL, the user is prompted as to whether the new URL is to replace the bookmarked URL. If so, the URL is bookmarked and the existing bookmarked URL is deleted (steps 525, 530 and 535). If the user chooses not to replace the existing bookmarked URL by the new URL, the new URL is simply bookmarked without deleting the previously bookmarked URL (steps 525, 530 and 520).

In the case where a root URL is compared with the URL of the Web page to be bookmarked, before actually bookmarking the new URL, a check may also be done to determine whether the title of the new Web page is identical to the title of an already bookmarked Web page. If so, the new URL may possibly replace the URL of the already bookmarked page.

The description of the present invention has been presented for purposes of illustration and description, and is not intended to be exhaustive or limited to the invention in the form disclosed. Many modifications and variations will be apparent to those of ordinary skill in the art. For example, more than one background search may be performed with the invention. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method of managing a bookmark folder comprising the steps of:
    accessing a bookmarked Web page;
    accessing a new Web page via a link from the accessed bookmarked Web page; and
    bookmarking the newly accessed Web page, said step of bookmarking the newly accessed Web page including the step of determining, even if the newly accessed Web page has a different name than the previously bookmarked Web page, whether the bookmarked Web page having the link to the newly accessed Web page is to be deleted from the bookmark folder and the step of deleting the previously bookmarked Web page from the bookmark folder if it is so determined.

2. The method of claim 1 wherein the step of determining includes the step of comparing URL of the Web page to be bookmarked with URLs of bookmarked Web pages in the folder.

3. The method of claim 2 wherein URLs of two Web pages are similar if they differ by N branches, N being an integer.

4. The method of claim 3 wherein URLs of bookmarked Web pages stored in Nth level of the folder are compared with the URL of the Web page to be bookmarked, N being an integer.

5. A computer program product in a computer readable medium for managing a bookmark folder comprising:
    code means for accessing a bookmarked Web page;
    code means fox accessing a new Web page via a link from the accessed bookmarked Web page; and
    code means for bookmarking the newly accessed Web page, said code means for bookmarking the newly accessed Web page including code means for determining, even if the newly accessed Web page has a different name than the previously bookmarked Web page, whether the bookmarked Web page having the link to the newly accessed Web page is to be deleted from the bookmark folder and code means for deleting the previously bookmarked Web page from the bookmark folder if it is so determined.

6. The computer program product of claim 5 wherein the determining code means for includes code means for comparing URL of the Web page to be bookmarked with URLs of bookmarked Web pages in the folder.

7. The computer program product of claim 6 wherein URLs of two Web pages are similar if they differ by branches, N being an integer.

8. The computer program product of claim 7 wherein URLs of bookmarked Web pages stored in Nth level of the folder are compared with the URL of the Web page to be bookmarked, N being an integer.

9. An apparatus for managing a bookmark folder comprising:
    means for accessing a bookmarked Web page;
    means for accessing a new Web page via a link from the accessed bookmarked Web page; and means for bookmarking the newly accessed Web page, said means for bookmarking the newly accessed Web page including means for determining, even if the newly accessed Web page has a different name than the previously bookmarked Web page, whether the bookmarked Web page having the link to the newly accessed Web page is to be deleted from the bookmark folder and means for deleting the previously bookmarked Web page from the bookmark folder if it is so determined.

10. The apparatus of claim 9 wherein the deleting means includes means for comparing URL of the Web page to be bookmarked with URLs of bookmarked web pages in the folder.

11. The apparatus of claim 10 wherein URLs of two pages are similar if they differ by N branches, N being an integer.

12. The apparatus of claim 11 wherein URLs of bookmarked Web pages stored in Nth level of the folder are compared with the URL of the Web page to be bookmarked, N being an integer.

13. A computer system comprising:

at least one storage device for storing code data; and at least one processor for processing the code data to access a bookmarked Web page, to access a new Web page via a link from the accessed bookmarked Web page, and to bookmark the newly accessed Web page, the code data processed to bookmark the newly accessed Web page is further processed to determine, even if the newly accessed Web page has a different name than the previously bookmarked Web page, whether the bookmarked Web page having the link to the newly accessed Web page is to be deleted from the bookmark folder and to delete the previously bookmarked Web page from the bookmark folder if it is so determined.

14. The computer system of claim 13 wherein the coda data processed to determine whether the bookmarked Web page is to be deleted is further processed to compare URL of the Web page to be bookmarked with URLs of bookmarked Web pages in the folder.

15. The computer system of claim 14 wherein URLs of two Web pages are similar if they differ by N branches, N being an integer.

16. The computer system of claim 15 wherein URLs of bookmarked Web pages stored in Nth level of the folder are compared with the URL of the Web page to be bookmarked, N being an integer.

\* \* \* \* \*